(12) United States Patent
Sudo

(10) Patent No.: US 8,564,898 B2
(45) Date of Patent: Oct. 22, 2013

(54) MAGNETIC DISK DRIVE AND CONTROL METHOD

(75) Inventor: Daisuke Sudo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/372,396

(22) Filed: Feb. 13, 2012

(65) Prior Publication Data
US 2012/0236432 A1    Sep. 20, 2012

(30) Foreign Application Priority Data

Mar. 14, 2011  (JP) .................. 2011-055668
Apr. 15, 2011  (JP) .................. 2011-091263

(51) Int. Cl.
*G11B 5/596* (2006.01)
(52) U.S. Cl.
USPC ............. 360/77.02; 360/77.04; 360/77.08; 360/78.04
(58) Field of Classification Search
None
See application file for complete search history.

(56) References Cited

U.S. PATENT DOCUMENTS

| 6,735,041 B1 * | 5/2004 | Codilian et al. ........... 360/78.06 |
| 6,754,442 B1 | 6/2004 | Nagai et al. |
| 6,757,230 B2 | 6/2004 | Noda et al. |
| 7,639,446 B2 * | 12/2009 | Mizukoshi et al. ......... 360/75 |

FOREIGN PATENT DOCUMENTS

| JP | 8129827 | 5/1996 |
| JP | 3507775 | 3/2004 |
| JP | 3879327 | 2/2007 |

* cited by examiner

*Primary Examiner* — Andrew L Sniezek
(74) *Attorney, Agent, or Firm* — Patterson & Sheridan, LLP

(57) ABSTRACT

According to one embodiment, a magnetic disk device includes: a magnetic disk having data spiral tracks extending from an outer circumference towards an inner circumference or from an inner circumference towards an outer circumference; a head configured to read data recorded in the data tracks of the magnetic disk that is rotating and to write data to the data tracks; and a controller configured to control the head to follow a predetermined data track in units obtained by subtracting a seek time required for the head to seek the predetermined data track from a rotation period.

3 Claims, 7 Drawing Sheets

MAGNETIC DISK DRIVE AND CONTROL METHOD

CROSS-REFERENCE TO RELATED APPLICATIONS

This application is based upon and claims the benefit of priority from Japanese Patent Application No. 2011-055668, filed Mar. 14, 2011 and Japanese Patent Application No. 2011-091263, filed Apr. 15, 2011, the entire contents of which are incorporated herein by reference.

FIELD

An embodiment described herein relates generally to a magnetic disk device and a control method.

BACKGROUND

Conventionally, for data tracks on a magnetic disk medium in a magnetic disk device such as a hard disk drive (HDD), a spiral data track system is available in which the data tracks are arranged in a spiral form from an outer circumference towards an inner circumference of the disk medium or from an inner circumference towards an outer circumference thereof so as to improve sequential access performance of the head of the disk device.

In a spiral data track system, for example, when a head is made to follow data tracks in a spiral form from an outer circumference towards an inner circumference, the head moves from the outer circumference towards the inner circumference. Accordingly, when controlling the head to follow part of the tracks repeatedly, it is necessary to perform a seek operation at the time when the head directed towards the center is returned towards the outer circumference. This may cause a waiting time for the head after being settled by the seek operation to reach a start point where it starts reading or writing data.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a magnetic disk device comprises a magnetic disk, a head, and a controller. The magnetic disk has data spiral tracks extending from an outer circumference towards an inner circumference or from an inner circumference towards an outer circumference. The head is configured to read data recorded in the data tracks of the magnetic disk that is rotating and to write data to the data tracks. The controller is configured to control the head to follow a predetermined data track in units obtained by subtracting a seek time required for the head to seek the predetermined data track from a rotation period.

With reference to the accompanying drawings, a magnetic disk device and a control method according to an embodiment will be described in detail. In the present embodiment, a hard disk drive mounted on an information apparatus such as a personal computer (PC) is exemplified as an example of a magnetic disk device.

Figure 1:
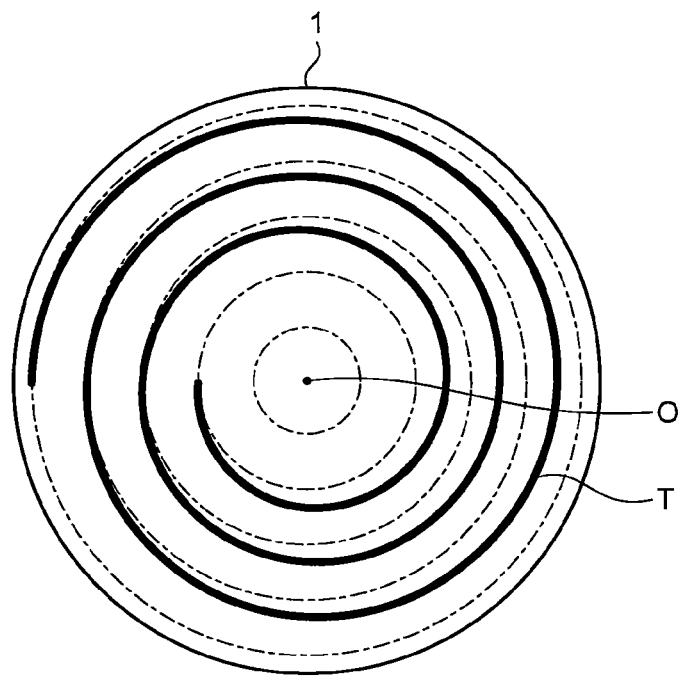
FIG. 1 is an exemplary conceptual diagram illustrating data tracks of a magnetic disk according to an embodiment.

FIG. 1 is a conceptual diagram of a data track of a magnetic disk according to the embodiment. As illustrated in FIG. 1, on a magnetic disk 1, a data track T is recorded in a spiral form from an outer circumference towards an inner circumference. In the illustrated example, although the data track T is exemplified to be recorded in a spiral form from the outer circumference towards the inner circumference in a clockwise direction, the data track T can obviously be recorded in a spiral form from an outer circumference towards an inner circumference in a counter-clockwise direction.

As it is apparent from comparison with data tracks T being recorded concentrically (dashed-dotted lines in FIG. 1), when a head is controlled to follow the data tracks T of the rotating magnetic disk 1, the head is shifted in a radial direction along with the rotation of the magnetic disk 1. Accordingly, when controlling the head to follow a data track T for one revolution repeatedly, it is necessary to perform a seek operation for the head to return from an end point where the head ends reading or writing to a start point where the head starts reading or writing, and thus it causes a waiting time until the head after being settled or set by the seek operation reaches the start point.

Therefore, in the present embodiment, the head is controlled to follow a data track T in units obtained by subtracting a seek time required for the head to seek the data track T from an integer multiple of a rotation period. The head is controlled to follow a data track T based on time obtained by subtracting a seek time required for the head to seek the data track T from an integer multiple of a rotation period. Controlling in this way makes it possible to reduce the above-described waiting time, because, for example, when controlling the head to follow a part of a data track T to read data repeatedly, the head after being settled by a seek operation is positioned at a start point where it starts reading.

Figure 2:
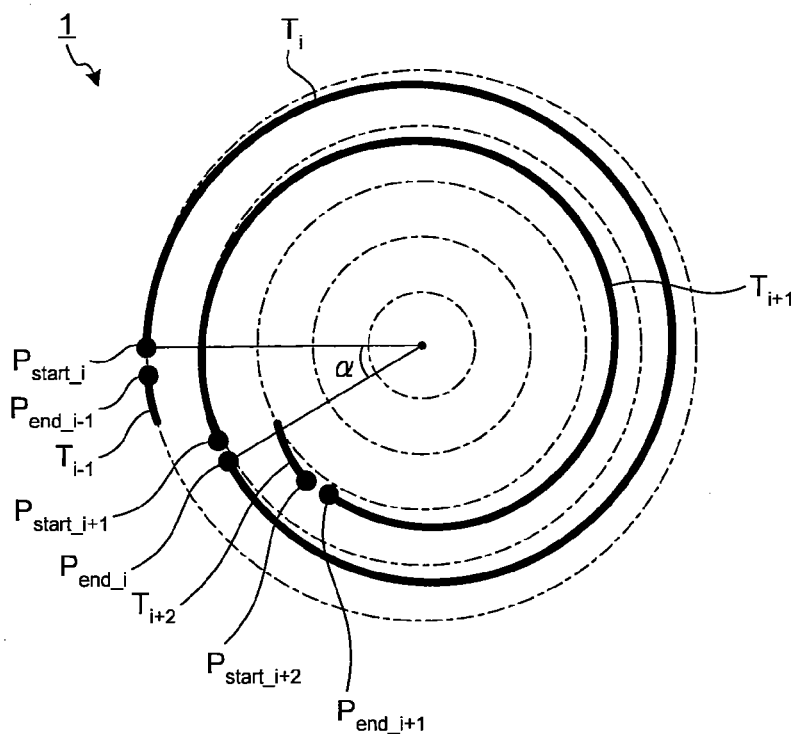
FIG. 2 is an exemplary conceptual diagram illustrating start points and end points of data tracks when controlling a head to follow a data track in units obtained by subtracting a seek time required for the head to seek the data track from a rotation period in the embodiment.

FIG. 2 is a conceptual diagram illustrating start points ($P_{start\_i}$, $P_{start\_i+1}$, $P_{start\_i+2}$) and end points ($P_{end\_i-}$, $P_{end\_i}$, $P_{end\_i+1}$) when controlling the head to follow the data tracks T ($T_{i-1}$, $T_i$, $T_{i+1}$, $T_{i+2}$, ...) in units obtained by subtracting a seek time from a rotation period.

As illustrated in FIG. 2, each of the data tracks $T_{i-1}$, $T_i$, $T_{i+1}$, $T_{i+2}$, ... is configured as a length obtained by subtracting a distance corresponding to a rotation angle α that is required for the head to seek from one revolution length. Specifically, the data track $T_i$ is from the start point $P_{start\_i}$ ($\cong P_{end\_i-1}$) to the end point $P_{end\_i}$ ($\cong P_{start\_i+1}$), and an angle defined by the start point $P_{start\_i}$ and the end point $P_{end\_i}$ with respect to the center of the magnetic disk 1 is the rotation angle α of the magnetic disk 1 for the seek time.

Figure 3:
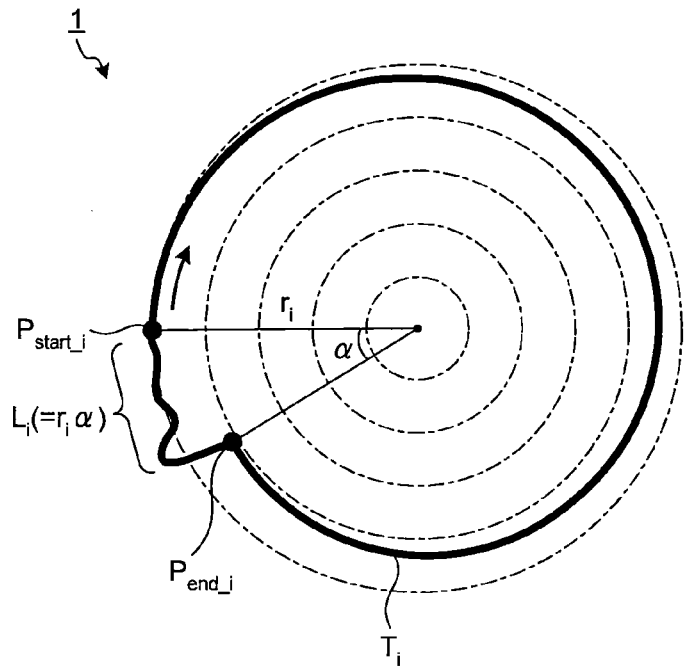
FIG. 3 is an exemplary conceptual diagram illustrating a trace of the head when controlling the head to follow a data track in units obtained by subtracting a seek time required for the head to seek the data track from a rotation period in the embodiment.
Figure 4:
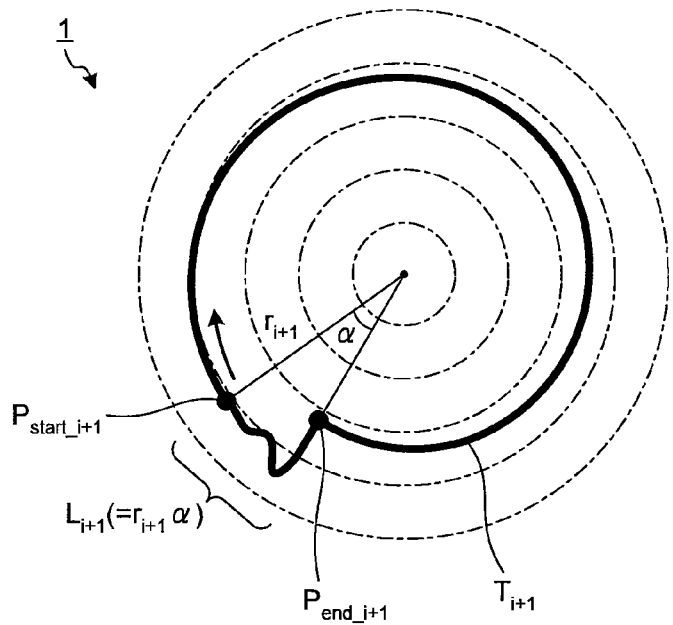
FIG. 4 is an exemplary conceptual diagram illustrating a trace of the head when controlling the head to follow a data track in units obtained by subtracting a seek time required for the head to seek the data track from a rotation period in the embodiment.

FIG. 3 is a conceptual diagram illustrating a trace of the head when controlling the head to follow the data track $T_i$ in units obtained by subtracting a seek time from a rotation period. FIG. 4 is a conceptual diagram illustrating a trace of the head when controlling the head to follow the data track $T_{i+1}$ in units obtained by subtracting a seek time from a rotation period.

As illustrated in FIG. 3, when controlling the head to follow the data track $T_i$, a seek operation from the end point $P_{end\_i}$ to a radius $r_i$ is started and the seek operation is settled at the start point $P_{start\_i}$ where the head is advanced a seek length $L_i$ corresponding to the rotation angle α of the magnetic disk 1. In other words, the distance of the head moving in a circumferential direction of the magnetic disk 1 during the seek time corresponding to the rotation angle α is the seek length. Similarly, as illustrated in FIG. 4, when controlling the head to follow the data track $T_{i+1}$, a seek operation from the endpoint $P_{end\_i+1}$ a radius $r_{i+i}$ is started, and at the start point $P_{start\_i+1}$ where the head is advanced a seek length $L_{i+1}$ corresponding to the rotation angle α of the magnetic disk 1, the seek operation is settled. Consequently, the head after being settled by the seek operation is positioned at the start point $P_{start\_i}$ or $P_{start\_i+1}$, whereby a waiting time can be reduced.

Figure 5:
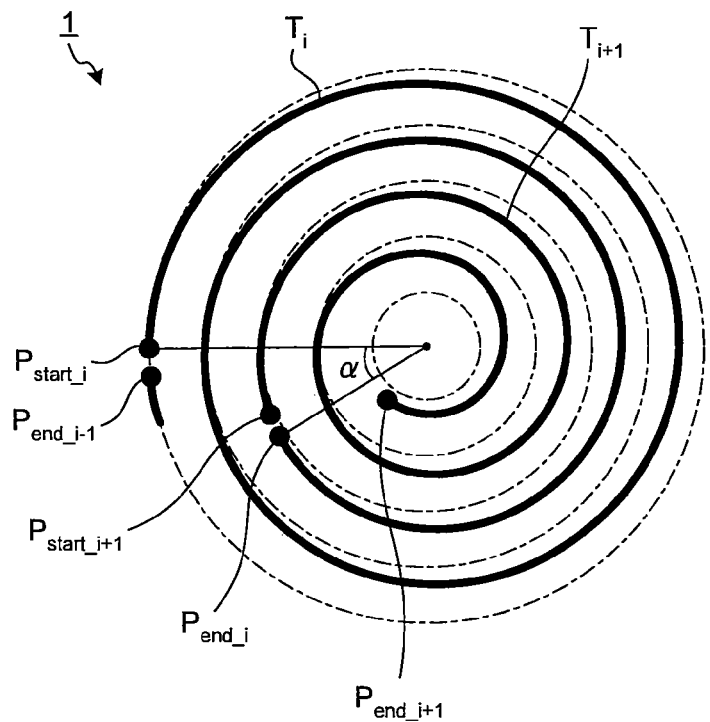
FIG. 5 is an exemplary conceptual diagram illustrating start points and end points of data tracks when controlling the head to follow a data track in units obtained by subtracting a seek time required for the head to seek the data track from an integer multiple of a rotation period in the embodiment.
Figure 6:
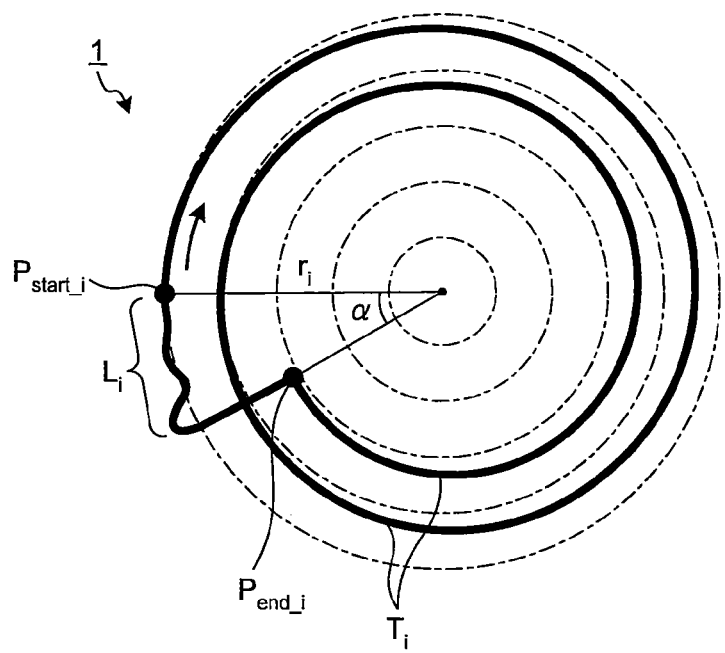
FIG. 6 is an exemplary conceptual diagram illustrating a trace of the head when controlling the head to follow a data track in units obtained by subtracting a seek time required for the head to seek the data track from an integer multiple of a rotation period in the embodiment.
Figure 7:
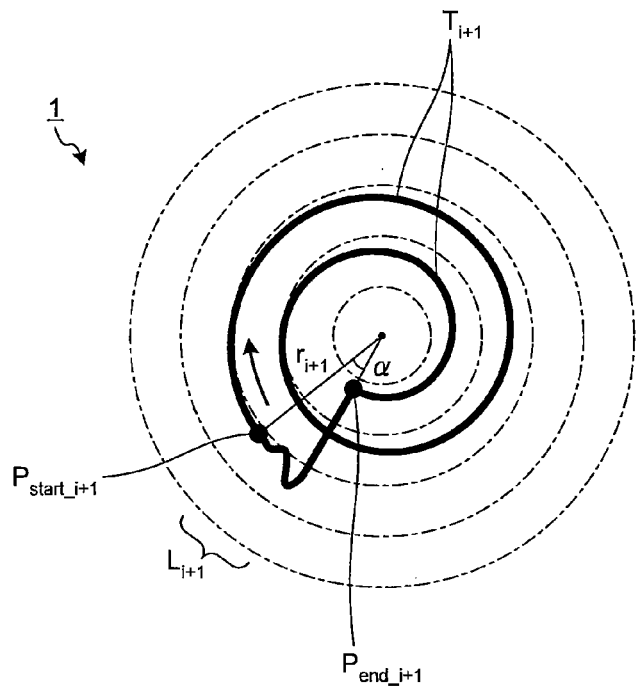
FIG. 7 is an exemplary conceptual diagram illustrating a trace of the head when controlling the head to follow a data track in units obtained by subtracting a seek time required for the head to seek the data track from an integer multiple of a rotation period in the embodiment.

While it has been exemplified that the unit obtained by subtracting a seek time from a rotation period is set as less than one revolution, when controlling the head to follow the data track T over a plurality of revolutions, it is similarly carried out in units obtained by subtracting a seek time from a rotation period. FIG. 5 is a conceptual diagram illustrating start points and end points of the data tracks T when controlling the head to follow a data track in units obtained by subtracting a seek time from an integer multiple of a rotation period. FIGS. 6 and 7 are conceptual diagrams illustrating traces of the head when controlling the head to follow the data track T in units obtained by subtracting a seek time from a rotation period. More specifically, in FIGS. 5, 6, and 7, a case of controlling the head to follow a data track over a plurality of revolutions (comparable to two revolutions in illustrated examples) is illustrated.

As illustrated in FIG. 5, the data track $T_i$ comparable to two revolutions is from the start point $P_{start\_i}$ to the endpoint $P_{end\_i}$, and an angle defined by the start point $P_{start\_i}$ and the end point $P_{end\_i}$ with respect to the center of the magnetic disk 1 is the rotation angle α of the magnetic disk 1 for the seek time. As illustrated in FIG. 6, when controlling the head to follow the data track $T_i$, a seek operation from the end point $P_{end\_i}$ to the radius $r_i$ is started and the seek operation is settled at the start point $P_{start\_i}$ where the head is advanced the seek length $L_i$ corresponding to the rotation angle α of the magnetic disk 1. Similarly, as illustrated in FIG. 7, when controlling the head to follow the data track $T_{i+i}$, a seek operation from the endpoint $P_{end\_i+1}$ to the radius $r_{i+1}$ is started and the seek operation is settled at the start point $P_{start\_i+1}$ where the head is advanced the seek length $L_{i+1}$ corresponding to the rotation angle α of the magnetic disk 1. Consequently, the head after being settled by the seek operation is positioned at the start point $P_{start\_i}$ or $P_{start\_i+1}$, whereby a waiting time can be reduced.

Figure 8:
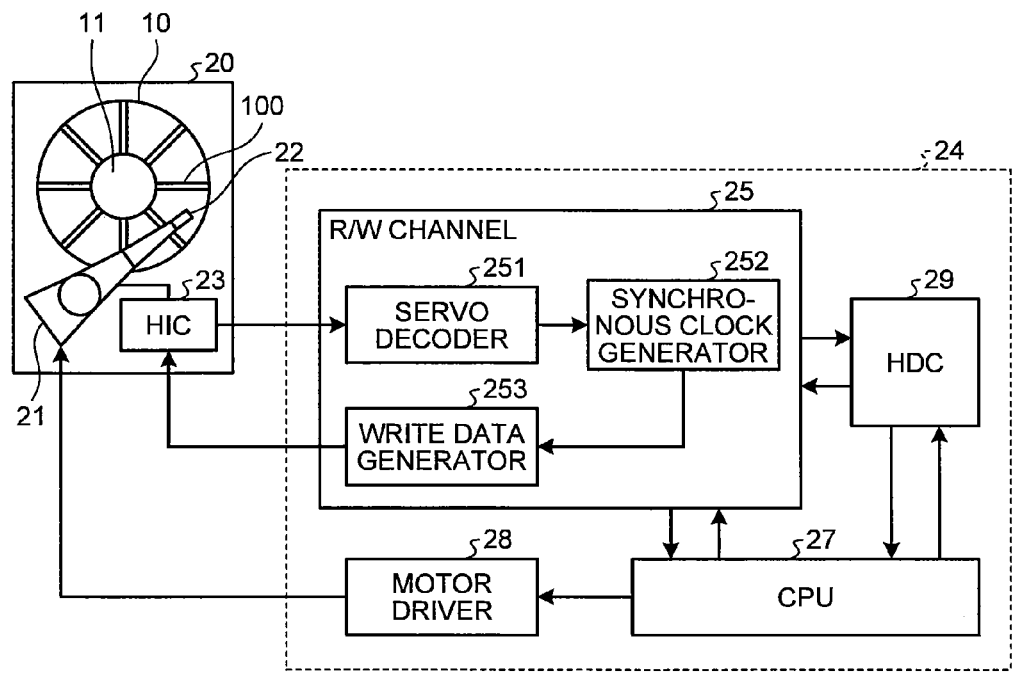
FIG. 8 is an exemplary block diagram illustrating a configuration of a magnetic disk device according to the embodiment.

An operation of a magnetic disk device that performs the above-described control when writing repeatable run-out (RRO) information indicating RRO to servo areas on the magnetic disk 1 will be described. FIG. 8 is a block diagram of a configuration of a magnetic disk device 20 according to the embodiment.

As illustrated in FIG. 8, the magnetic disk device 20 comprises an actuator arm 21 mounted with a head 22, a head IC circuit 23 having functions such as an amplifier, and a printed circuit substrate 24. The head 22 is provided at the leading end of the actuator arm 21. The head 22 is a so-called integrated head and includes a read head for reading data (including servo patterns) from the magnetic disk 1 and a write head for writing data to the magnetic disk 1.

The actuator arm 21 is driven by a voice coil motor (VCM) not depicted and moves the head 22 in the radius direction of the magnetic disk 1. The printed circuit substrate 24 is mounted with a read/write (R/W) channel 25, a central processing unit (CPU) 27, a motor driver 28, and a hard disk controller (HDC) 29.

The R/W channel 25 is a signal processing circuit that processes read/write signals of servo patterns and user data. The R/W channel 25 reproduces user data read out by the read head and sends the user data to the HDC 29. Furthermore, the R/W channel 25 converts the user data output from the HDC 29 into a write signal and outputs the write signal to the head IC circuit 23.

The R/W channel 25 comprises a servo decoder 251 that decodes servo patterns read out by the read head, a synchronous clock generator 252 that generates a servo write clock which is a reference clock, and a write data generator 253 that controls writing of data such as servo data in synchronization with the servo write clock. Accordingly, the R/W channel 25 may realize, working together with the CPU 27, a function as a servo writing module that executes a self-servo writing process.

The CPU 27 controls the actuator arm 21 to move and position the head 22 to a specified position on the magnetic disk 1 rotated by a spindle motor 11. At this time, when controlling the head 22 to follow the same portion of the data track T repeatedly so as to calculate the RRO information, the head 22 is controlled to follow the data track T in units obtained by subtracting a seek time from an integer multiple of a rotation period. Specifically, based on a seek time set in advance in a memory and the like and a rotation speed of the magnetic disk 1 rotated by the spindle motor 11, a rotation angle by which the magnetic disk 1 is rotated in the seek time is calculated. Then, based on the calculated rotation angle (α) and a position (r) of the data track T in the radius direction, a seek length (L) is obtained. Accordingly, the CPU 27 controls the head 22 so as to finish reading at an end point at a distance of a seek length back from a start point where the head 22 starts reading and to return to the start point. An endpoint is a position where a seek length is subtracted from a start point. Controlling in this way makes it possible to shorten a waiting time when controlling the head to follow the data track T in a spiral data track system in the magnetic disk device 20.

Figure 9:
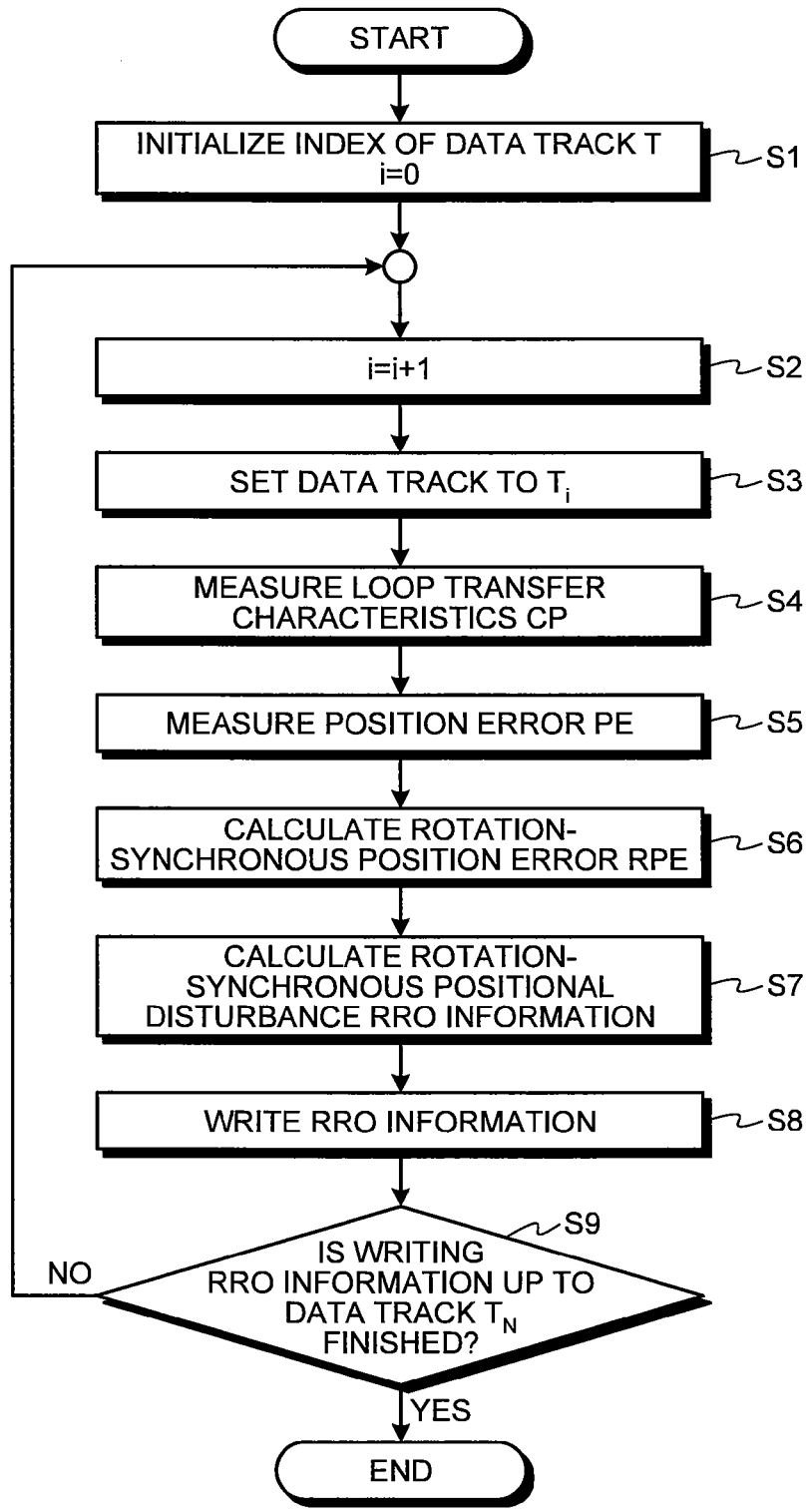
FIG. 9 is an exemplary flowchart illustrating an example operation of writing RRO information in the embodiment.

An operation of writing the RRO information will be described in detail. FIG. 9 is a flowchart of writing processing of the RRO information.

As illustrated in FIG. 9, when the process is started, the CPU 27 initializes an index (i) of a data track T (i=0) in the radius direction for which the RRO information is calculated (S1). The indices of the data tracks T assigned are assumed to be increased from an outer circumference towards an inner circumference.

The CPU 27 then increments the index (i=i+1) of the data track T (S2), and sets the position of the data track T in the radius direction for which the RRO information is calculated to $T_i$ (S3). The CPU 27 starts to follow the data track $T_i$ in units obtained by subtracting a seek time from an integer multiple of a rotation period.

Figure 10:
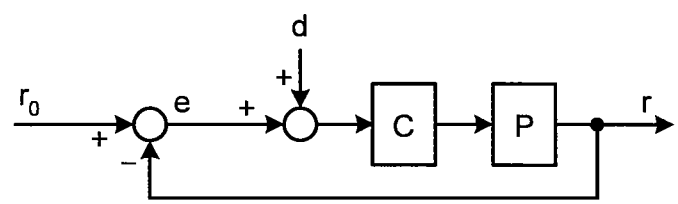
FIG. 10 is an exemplary block diagram concerning a measurement of loop transfer characteristics in the embodiment.

The CPU 27 then measures servo loop transfer characteristics CP for the data track $T_i$ (S4). FIG. 10 is a block diagram for explaining the measurement of loop transfer characteristics. At S4, the measurement of servo loop transfer characteristics CP is carried out by the block diagram illustrated in FIG. 10. The letter C represents characteristics of feedback control and the letter P represents characteristics of a voice coil motor (VCM) plant of the actuator arm 21. Then, a servo sensitivity function S is calculated as Formula 1.

$$S=(1+CP)^{-1} \quad (1)$$

When a residual repeatable position error (RPE) after applying a correction by the RRO information satisfies required specifications, it is not necessarily needed to measure the loop transfer characteristics CP and to calculate the sensitivity function S for all data tracks $T_i$, and a sensitivity function S calculated for a previous data track $T_i$ may be used.

The CPU 27 then measures a position error PE one or more times during seeking the data track on which a reproducing head travels when recording or reproducing data (S5). The CPU 27 then calculates, using the position error PE measured one or more times at S5, a rotation-synchronous position error RPE with a rotation-asynchronous non-repeatable position error (NRPE) removed by averaging as in Formula 2 (S6). The term SvSCT in Formula 2 represents a servo sector number and the term $N_{meas}$ represents the number of times the position error PE is measured.

$$RPE(SvSCT) = \frac{1}{N_{meas}} \sum_{i=1}^{N_{meas}} PE(SvSCT, i) \quad (2)$$

The CPU 27 then calculates the RRO information indicative of rotation-synchronous positional disturbance as in Formula 3, based on the sensitivity function S calculated at S4 and the rotation-synchronous position error RPE calculated at S6 (S7). For example, a Fourier transform computation is performed on the rotation-synchronous position error RPE measured during seeking the data track where the reproducing head travels when recording and reproducing data and the calculation of Formula 3 is performed in a frequency domain. Then, an inverse Fourier transformation is performed to calculate the RRO information, and the RRO information of the data track where the reproducing head travels when recording and reproducing data except during seeking is written to a servo area.

$$RRO=RPE \times S^{-1} \quad (3)$$

Figure 11:
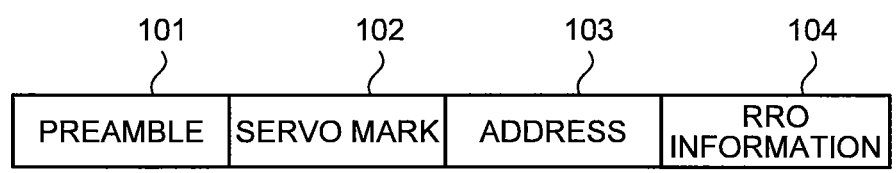
FIG. 11 is an exemplary conceptual diagram illustrating an example of a servo format in the embodiment.

Then, the CPU 27 writes the calculated RRO information within a servo area on the magnetic disk 1 (S8). FIG. 11 is a conceptual diagram illustrating an example of a servo format. As illustrated in FIG. 11, in a servo area, writing is performed in a servo format that includes a preamble 101, a servo mark 102, address information 103, and RRO information 104.

The CPU 27 then checks whether the RRO information is written to all areas necessary to write the RRO information (S9). Specifically, it is checked whether the RRO information is written up to a data track $T_N$ which is the closest to the center O in the radius direction of the data track T. When writing the RRO information up to the data track $T_N$ is not finished, the process is returned to S2. When writing the RRO information up to the data track $T_N$ is finished, the operation of writing the RRO information is terminated.

A comparison is made between when controlling a head to follow the data track T in units of an integer multiple of a rotation period and when controlling the head to follow the data track T in units obtained by subtracting a seek time from an integer multiple of a rotation period.

When controlling a head to follow the data track T in units of an integer multiple of a rotation period and when the measurements are carried out $N_{meas}$ times to calculate a rotation-synchronous position error RPE, it is necessary to seek a start point of the data track T $N_{meas}$ times. When the seek time required for residual vibration during the seek to be settled is defined as $T_{seek}$ and a rotation waiting time after seeking is defined as $T_{wait}$, the time $t_0$ required for measuring RPE of $N_{rev}$ revolutions is represented in Formula 4. Because the time $T_{seek}+T_{wait}$ is the waiting time for the head to move up to the start point after settling, it is equivalent to $T_{1rev}$ (time for one revolution).

$$t_0=N_{rev}\{N_{meas}(T_{1rev}+T_{seek}+T_{wait})\}=2N_{rev}N_{meas}T_{1rev} \quad (4)$$

The time $T_{nor0}$ required for measuring RPE per one revolution is represented in Formula 5.

$$t_{nor0} = \frac{1}{N_{rev}} t_0 = 2N_{meas}T_{1rev} \quad (5)$$

When controlling a head to follow the data track T in units obtained by subtracting a seek time from a rotation period, the measurements to calculate a rotation-synchronous position error RPE are carried out in units of a non-integer multiple of a rotation period. Accordingly, because the number of measuring revolutions $N_{rev}'$ is of $T_{seek}$ being subtracted, it comes to Formula 6.

$$N_{rev}' = \frac{T_{1rev} - T_{seek}}{T_{1rev}} \quad (6)$$

*where $0 < N_{rev}' < 1$

Therefore, the time $t_2$ required for measuring RPE when controlling the head to follow the data track T in units obtained by subtracting a seek time from a rotation period comes to Formula 7. As it is apparent from comparison between Formula 4 and Formula 7, controlling the head to follow the data track T in units obtained by subtracting a seek time from a rotation period makes it possible to reduce the time required for measuring RPE.

$$t_2 = N_{meas}(T_{1rev}N_{rev}' + T_{seek}) = N_{meas}T_{1rev} \quad (7)$$

When the data track T is recorded in a spiral form, different from being recorded in a concentric manner, varying the data track length makes it possible to measure position error PE in plurality of revolutions continuously. For example, in the examples illustrated in FIGS. 5 to 7, a measurement comparable to two revolutions is carried out continuously. Accordingly, when a measuring frequency is defined as k, the number of measuring revolutions $N_{rev}'$ to measure the position error PE can be represented as Formula 8.

$$N_{rev}' = (k-1) + \frac{T_{1rev} - T_{seek}}{T_{1rev}} = \frac{kT_{1rev} - T_{seek}}{T_{1rev}} \quad (8)$$

*where $k$ is a natural number ($k = 1, 2, 3, \ldots$)

When k=1, Formula 8 corresponds to Formula 6. The time $t_3$ required to measure the position error PE for the number of measuring revolutions $N_{rev}'$ comes to Formula 9.

$$t_3 = N_{meas}(T_{1rev}N_{rev}' + T_{seek}) = N_{meas}T_{1rev}k \quad (9)$$

The time $T_{nor3}$ required for measuring RPE per one revolution is as Formula 10.

$$t_{nor3} = \frac{1}{N_{rev}'}t_3 = N_{meas}T_{1rev}\frac{kT_{1rev}}{kT_{1rev} - T_{seek}} \quad (10)$$

A difference time $\Delta_3$ in comparison to that carried out in units of an integer multiple of a rotation period is represented in Formula 11.

$$\Delta_3 = t_{nor3} - t_{nor0} = -N_{meas}T_{1rev}\frac{kT_{1rev} - 2T_{seek}}{kT_{1rev} - T_{seek}} \quad (11)$$

Figure 12:
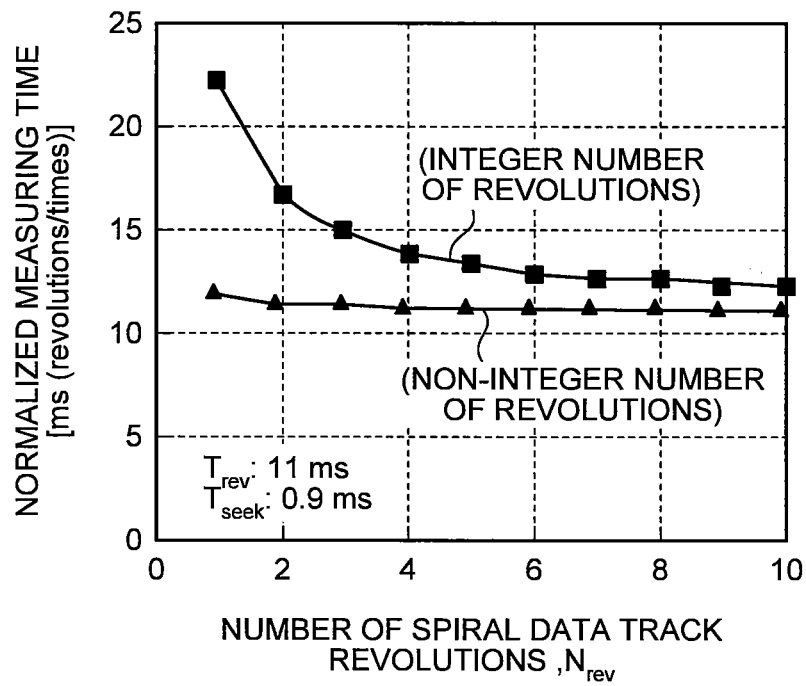
FIG. 12 is an exemplary graph illustrating a relationship of spiral data track lengths and position error measuring time normalized to one revolution in the embodiment.
Figure 13:
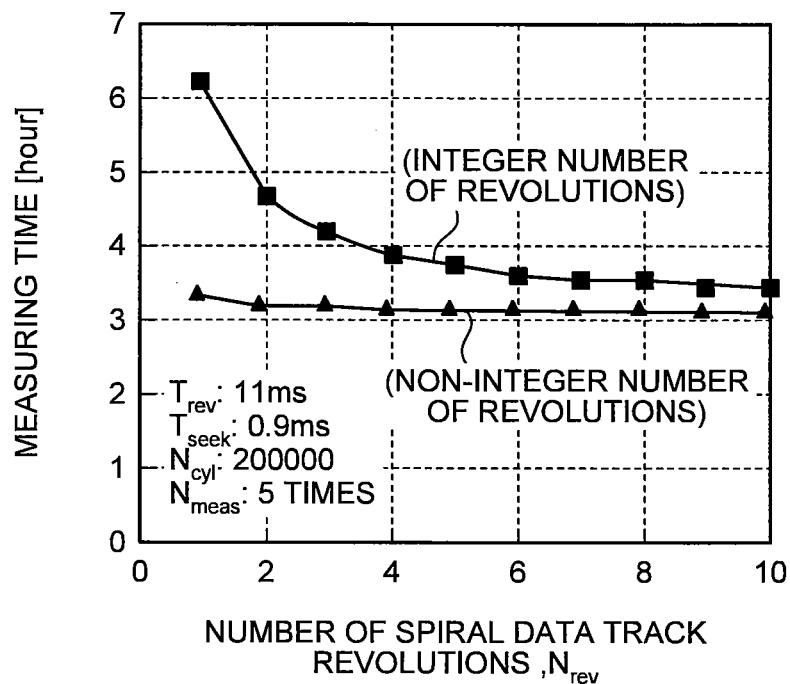
FIG. 13 is an exemplary graph illustrating a relationship of spiral data track lengths and time required for measuring position error in a magnetic disk device having a total of 200,000 cylinders on a single surface of a magnetic disk in the embodiment.

FIG. 12 is a graph indicating a relationship of spiral data track lengths and position error measuring time normalized to one revolution. FIG. 13 is a graph, in a magnetic disk device of a total of 200,000 cylinders per single surface of a magnetic disk, indicating a relationship of spiral data track lengths and time taken for measuring position errors. A cylinder is defined as a track of one revolution, and the number of position error measurements to calculate RPE is set as five times. As it is apparent also from FIGS. 12 and 13, controlling the head to follow the data track T in units obtained by subtracting a seek time from an integer multiple of a rotation period makes it possible to shorten the time required for measurement.

In the magnetic disk device 20, a data sector length of data recorded onto the data track T of the magnetic disk 1 may be set in units obtained by subtracting a seek time from an integer multiple of a rotation period. Specifically, the data track $T_i$, the data track $T_{1+1}$, … depicted in FIGS. 2 and 5 may be defined as the data sector lengths. Setting the data sector length in this way makes it possible to improve a rotation waiting time in retry and such.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk having spiral data tracks extending from an outer circumference towards an inner circumference or from an inner circumference towards an outer circumference;
   a head configured to read data recorded in the data tracks of the magnetic disk that is rotating and to write data to the data tracks;
   a calculating module configured to calculate, based on the data read by the head from a predetermined data track, information indicating repeatable run-out of the data track;
   a writing module configured to write the calculated information to a servo area of the magnetic disk; and
   a controller configured to control the head to follow the predetermined data track in units obtained by subtracting the seek time, which is the time to return the head from an end point of a data track to a start point of the data track, from an integer multiple of the rotation period, which is the time for one revolution of the magnetic disk, when the information is calculated.

2. The magnetic disk device of claim 1, wherein the controller is configured to control the head to follow the predetermined data track to the end point at a distance of a seek length by which the head moves in a circumferential direction of the magnetic disk during the seek time back from the start point where the head starts reading or writing data.

3. A control method of a magnetic disk device comprising a magnetic disk having spiral data tracks extending from an outer circumference towards an inner circumference or from an inner circumference towards an outer circumference, and a head configured to read data recorded in the data tracks of the magnetic disk that is rotating and to write data to the data tracks, the control method comprising:
   calculating, based on the data read by the head from a predetermined data track, information indicating repeatable run-out of the data track;
   writing the calculated information to a servo area of the magnetic disk; and
   controlling the head to follow the predetermined data track in units obtained by subtracting the seek time, which is the time to return the head from an end point of a data track to a start point of the data track, from an integer multiple of the rotation period, which is the time for one revolution of the magnetic disk, when the information is calculated.

* * * * *